(12) United States Patent
Stephan

(10) Patent No.: US 11,131,075 B2
(45) Date of Patent: Sep. 28, 2021

(54) UNIVERSAL SKID-STEER AND 3-POINT HITCH ADAPTER

(71) Applicant: Michael F. Stephan, St. Croix Falls, WI (US)

(72) Inventor: Michael F. Stephan, St. Croix Falls, WI (US)

(*) Notice: Subject to any disclaimer, the term of this patent is extended or adjusted under 35 U.S.C. 154(b) by 0 days.

(21) Appl. No.: 16/742,949

(22) Filed: Jan. 15, 2020

(65) Prior Publication Data

US 2020/0392693 A1    Dec. 17, 2020

Related U.S. Application Data

(60) Provisional application No. 62/860,816, filed on Jun. 13, 2019.

(51) Int. Cl.
*E02F 3/36*    (2006.01)

(52) U.S. Cl.
CPC .......... *E02F 3/3627* (2013.01); *E02F 3/3686* (2013.01)

(58) Field of Classification Search
CPC ..................................................... E02F 3/3686
See application file for complete search history.

(56) References Cited

U.S. PATENT DOCUMENTS

| 2,287,152 | A  | * | 6/1942  | Waldecker | E02F 3/42 414/717 |
| 7,108,475 | B1 | * | 9/2006  | Gustafson | A01B 59/062 280/416.2 |
| 7,226,268 | B2 | * | 6/2007  | Gustafson | A01B 59/002 37/406 |
| 8,745,903 | B1 | * | 6/2014  | Ritter    | A01B 43/00 37/303 |
| 2007/0000673 | A1 | * | 1/2007 | Farnsworth | A01B 59/066 172/439 |
| 2008/0141566 | A1 | * | 6/2008 | Esser | E02F 3/3663 37/468 |
| 2009/0013565 | A1 | * | 1/2009 | Zettel | A01B 59/062 37/455 |
| 2015/0042116 | A1 | * | 2/2015 | Jacobson | E02F 3/404 294/197 |
| 2017/0290258 | A1 | * | 10/2017 | Mollick | A01B 59/002 |

OTHER PUBLICATIONS

Load-Quip Catalogue, 2016, 12 pages.

* cited by examiner

*Primary Examiner* — Gerald McClain
(74) *Attorney, Agent, or Firm* — Patterson Thuente Pedersen, P.A.

(57) ABSTRACT

An implement attachment adapter, including a centrally located top clevis; two spaced apart lower clevises located below the centrally located top clevis and on opposing sides of a line extending vertically through the top clevis. The two spaced apart lower clevises being are recessed into or behind a first face of a flat plate. The flat plate further includes side tabs located proximate each horizontal peripheral edge thereof extending outwardly away from the first face of the plate. A bottom tab extends outwardly downwardly away from the first face at an obtuse angle relative to the plate. A top bar extends across proximate a top portion of the plate and outwardly away from the first face of the plate and is oriented at an acute angle to the plate. The plate further presents engagement apertures and a second face opposing the first face to which the implement may be coupled.

18 Claims, 6 Drawing Sheets

UNIVERSAL SKID-STEER AND 3-POINT HITCH ADAPTER

CROSS-REFERENCE TO RELATED APPLICATION

The present application claims the benefit of U.S. Provisional Application No. 62/860,816, filed Jun. 13, 2019, which is hereby incorporated herein in its entirety by reference.

TECHNICAL FIELD

Embodiments of the invention relate to implements to be attached to motorized prime movers. More specifically, embodiments of the invention relate to skid steer and tractor attachments and implements

BACKGROUND

Many different prime movers are utilized in industries involving earthmoving, snowplowing, material handling and construction. Tractors are well known and commonly used. Skid steer loaders are also well known and commonly used. Skid steer loaders are often referred to simply as skid-steers.

Tractors and skid-steers are two different types of equipment that are commonly used by operators employed in many different industries to perform work. These machines are commonly and sometimes hereafter referred to, collectively as tool carriers. Tractors have been used to cultivate and harvest crops for decades. Skid-steers have been used to perform construction-related tasks for decades as well. Both of these pieces of equipment have also become more versatile, and are now used to help with many different types of projects, from planting, tilling, digging, snow removal, grading, drilling, and material handling.

Part of the versatility of these two pieces of equipment is their ability to carry and make use of many different attachments, which are commonly and sometimes hereafter referred to as implements. An implement is a tool for a piece of equipment that can be compared to utensils such as a knife, spoon, or a fork. Implements are often designed to perform a specific task or tasks, and make the tool carrier much more effective at doing a job. The tractor and skid-steer, without such implements are not as effective and useful.

For instance, if a pile of dirt needs to be moved from one location to another, an operator might choose to use a bucket type implement, attached to a skid steer or tractor to move the pile of dirt quickly. If the same operator also wished to accomplish another task such as digging a long and narrow trench, he might utilize a trencher Implement attached to the tractor or skid steer to quickly dig the trench. These are two very different tasks, and generally require a totally different implement, but the different implements can be attached to the same Tool Carrier.

SUMMARY

Skid-steers and tractors both have the ability to attach to and operate in concert with a variety of different implements however the methods and structures used to attach the implements to the tool carriers are usually different and incompatible between skid-steers and tractors.

Skid-Steers generally use what is commonly referred to as a "universal skid steer quick attach," for coupling to implements while tractors generally utilize what is commonly referred to as a "three point hitch". This means that many Implements that can easily attach to skid-steers, are not readily attached to or utilized with tractors, and vice versa.

Because many implements that are adapted to mate with skid steer loaders cannot be attached to tractors and many implements that are adapted couple to tractors cannot be attached to skid steer loaders owners and operators of both types of tool carriers are often required to purchase and maintain redundant implements. This presents obvious negative consequences due to expense, storage and maintenance requirements related to the duplication of the implements.

Since many of the implements are not able to be crossed over, it creates redundancy in the implements that an operator will need, and it would be beneficial if the operator was able to utilize implements with either the tractor or skid-steer. Currently, to use one implement on either a tractor or skid-steer, an operator must make use of an adapter interposed between the tool carrier and the implement so that whatever attachment style the implement has, whether that be the "universal skid steer quick attach" or the "three point hitch", the adapter would adapt one style to the other. While adapters allow the connection between the implement and the tool carrier to be made, problems arise from this method.

At least one problem that occurs is that the presence of the adapter increases the distance between the implement in the tool carrier. This alteration in geometry can create undesirable shifting of the center of gravity of the tool carrier/implement combination and may place excessive loads on portions of the tool carrier and/or the implement. A further disadvantage that is encountered is that the operator must purchase, store, transport and maintain at least two adapters, one for the tractor and one for the skid steer loader to facilitate coupling with implements that are designed for the other tool carrier.

Embodiments of the invention eliminate the need for a special adapter to be interposed between a "universal skid steer quick attach", and a "three point hitch". According to embodiments of the invention, an operator can readily attach either a skid-steer or a tractor to the same implement, without the need for a special adapter between the Implement and tool carrier and without the need to duplicate implements except for the mounting structures. The inventive design creates a versatile universal hitch that, when used in an Implement design, facilitates a built-in ability to attach that same implement to either skid-steers or tractors without having to change the tool carrier or utilize an adapter.

Embodiments of the invention include features to attach either the skid-steer or tractor tool carriers effectively. By combining the features of embodiments of the invention in such a way that they do not interfere with each other, most implements can be designed and built in such a way that they can be attached universally to either tool carrier.

Embodiments of the invention include a large rectangular plate or plates in a landscape orientation. The plate(s) features small tabs on each side, extending outwardly away from the plate and toward the tool carrier at about a 90 degree angle from the rectangular plate(s). At the bottom of the rectangular plate(s), there is another tab extending downwardly away from the plate and toward the tool carrier at about 125 degrees from the plane of the rectangular plate(s). The lower tab also presents spaced cutouts in or proximate the lower tab that are sized shaped and positioned to accept locking pins from coupler on the tool carrier. Proximate the top of the rectangular plate(s) is a top bar, which is usually welded or formed in place extending downwardly away at about a 32 degree angle relative to the rectangular plate, creating a lip which is used to secure attachment to the tool carrier in combination with the locking pins.

Embodiments of the invention also include a "three point hitch" portion including features adapted for securing 2 lower pins, and 1 upper pin to the implement to facilitate connection to a three point hitch of a tractor. Two lower clevises are structured to receive two lower pins. According to example embodiments of the invention, two groups of two tabs or plates with collinear holes are adapted to accept the pins. The two lower clevises are spaced an equal distance from the ground, equidistant from a centerline of the implement and parallel to each other. Two of the tabs or plates are located near to one another to the left of center and two of the tabs or plates are located near each other to the right of center. Each pair is referred to as a bottom clevis. The bottom clevises are spaced approximately 32 inches apart and located evenly spaced on either side of a centerline of the implement. Each bottom clevis is structured to have about 2.5" between plates.

The top clevis is located approximately 24 inches above the axis of the collinear holes of the bottom clevises. The top clevis may be adjustable in height and/or retractable to facilitate ease of implement use. According to an example embodiment of the invention, the bottom clevises are recessed into the large rectangular plate at proper locations to receive the two lower attachment members of the three point hitch. This provides access to the lower clevises and corresponding pins for the three point hitch. Furthermore, the top clevis of the three point hitch portion can be extended and retracted from behind the large rectangular plate and thus above the top bar of the skid-steer attachment portion to mitigate interference with the compatibility with the two different tool carriers.

Embodiments of the invention further include a method of coupling an implement with either of two different kinds of tool carriers, a first tool carrier utilizing a three point hitch and a second tool carrier utilizing a universal skid steer quick attach structure.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
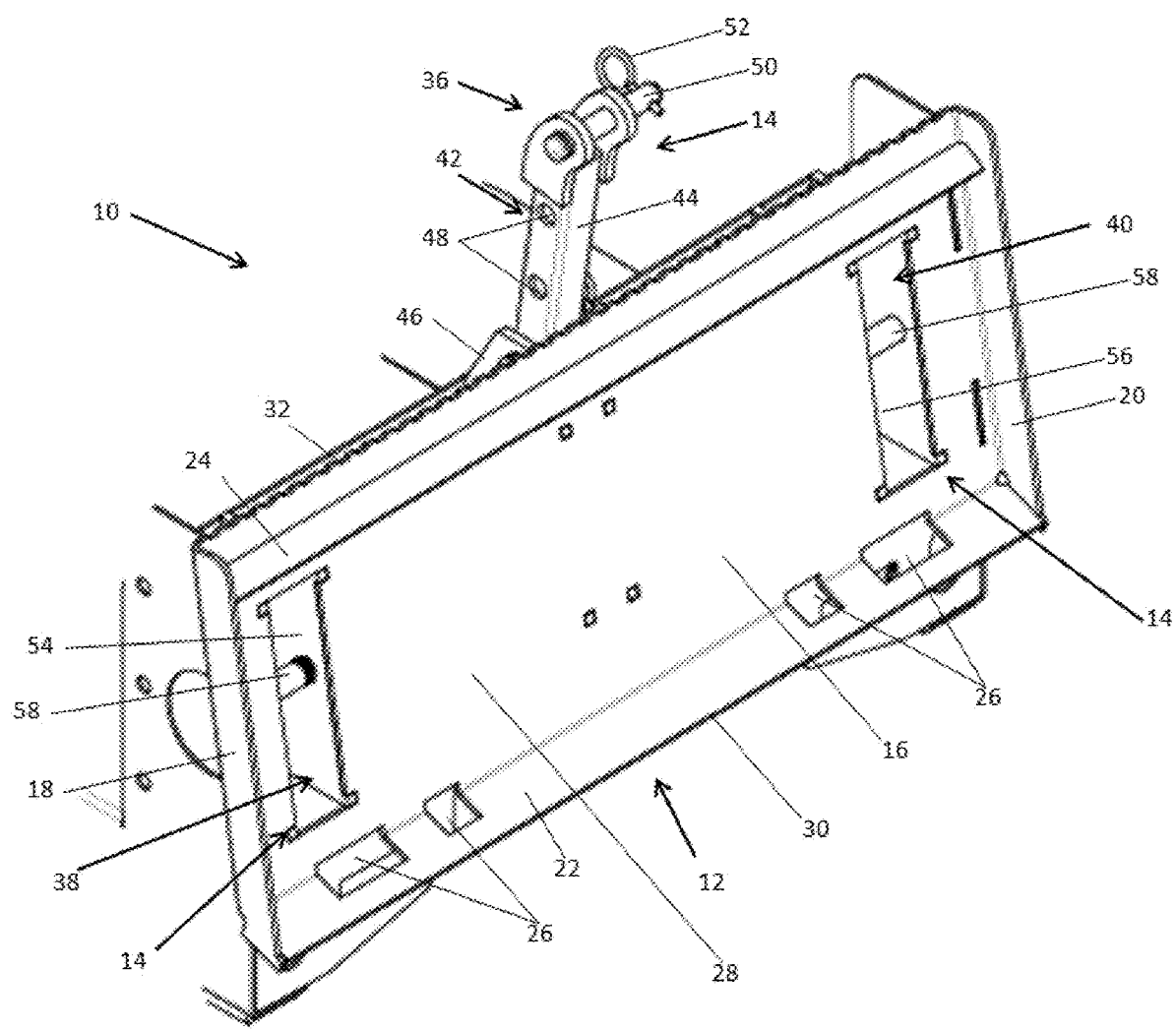
FIG. 1 is a perspective view of an attachment adapter according to an example embodiment of the invention with a central clevis depicted in an extended position.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Figure 2:
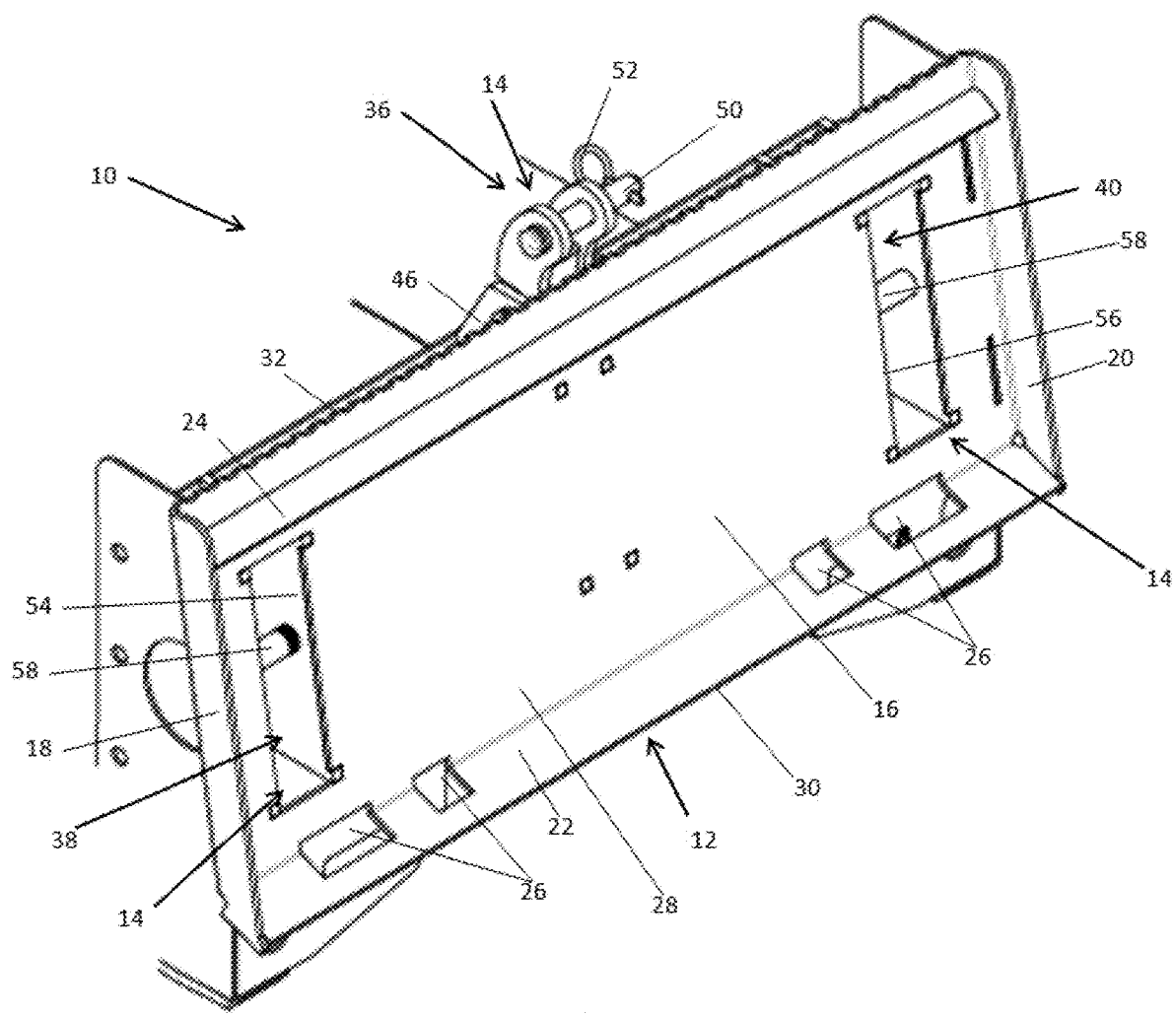
FIG. 2 is a perspective view of the embodiment depicted in FIG. 1 with the upper central clevis depicted in a retracted position.

Referring particularly to FIG. 1 and FIG. 2, adapter 10 according to an example embodiment of the invention is depicted. Adapter 10 generally includes adapter plate 12, and three point adapter structure 14.

Adapter plate 12 generally includes plate portion 16, the first side tab 18, second side tab 20, bottom tab 22, top bar 24 and coupling cutouts 26.

Plate portion 16 is a generally planar structure made of a rigid and strong material such as plate steel or heavy sheet steel. Other materials of substantial rigidity and strength can be utilized as well.

First side tab 18 and second side tab 20 extend outwardly away from first face 28 of the adapter plate 12 in a substantially orthogonal direction. First side tab 18 and second side tab 20 may be formed by bending and of the adapter plate 12 or coupling additional material thereto for example by welding.

Bottom tab 22 extends outwardly away and downwardly from lower edge 30 of adapter plate 12 at an obtuse angle. For example, bottom tab 22 may extend outwardly and downwardly from lower edge 30 of an angle of approximately 125 degrees with a range of plus of minus 10 degrees.

Top bar 24 extend at least partially across the upper edge 32 of adapter plate 12. Top bar 24 extends outwardly and downwardly from upper edge 32 of adapter plate 12 at an angle of approximately 32 degrees plus or minus 10 degrees. Top bar 24 need not extend the entire width of upper edge 32 of adapter plate 12. Instead, a top bar 24 may, for example, have two portions that extend inwardly a sufficient distance to engage with the mating quick attach structure 34 as depicted for example in FIG. 6.

Coupling cutouts 26 are opening this in either or both of adapter plate 12 and bottom tab 22. Coupling cutouts 26 are made in a size and shape that are known to those of skill in the art and are sized and located to receive engagement members that are associated with mating quick attach structure 34.

Three point adapter structure 14 generally includes top clevis 36, first lower clevis 38 and second lower clevis 40.

Top clevis 36 is located generally centrally proximate a top edge of adapter plate 12. According to an example embodiment of the invention, top clevis 36 may be supported by adjustable supporting member 42. In the depicted embodiment, supporting member 42 includes square tube 44 slidable within a second square tube (not shown) or square tube supporting structures 46. Square tube 44 may include multiple apertures 48 through which a pin may be inserted and square tube supporting structure 46 to lock square tube 44 in relation to square tube supporting structures 46 in multiple positions. Thus, top clevis 36 may be retracted or extended between and among multiple positions. Top clevis 36 is structured to receive fastener 50 therethrough which may be secured, for example, by hairpin clip 52. Other fasteners may be utilized as well.

First lower clevis at 38 and second lower clevis 40 are each recessed into adapter plate 12 via openings therein. First lower clevis at 38 and second lower clevis 40 each further include proximal engagement structure 54 and distal engagement structure 56. Proximal engagement structure 54 and distal engagement structure 56 each may include for example, a flat plate having an aperture therethrough. Proximal engagement structure 54 and distal engagement structure 56 may include any structure capable of receiving lower clevis fastener 58 therethrough.

Figure 3:
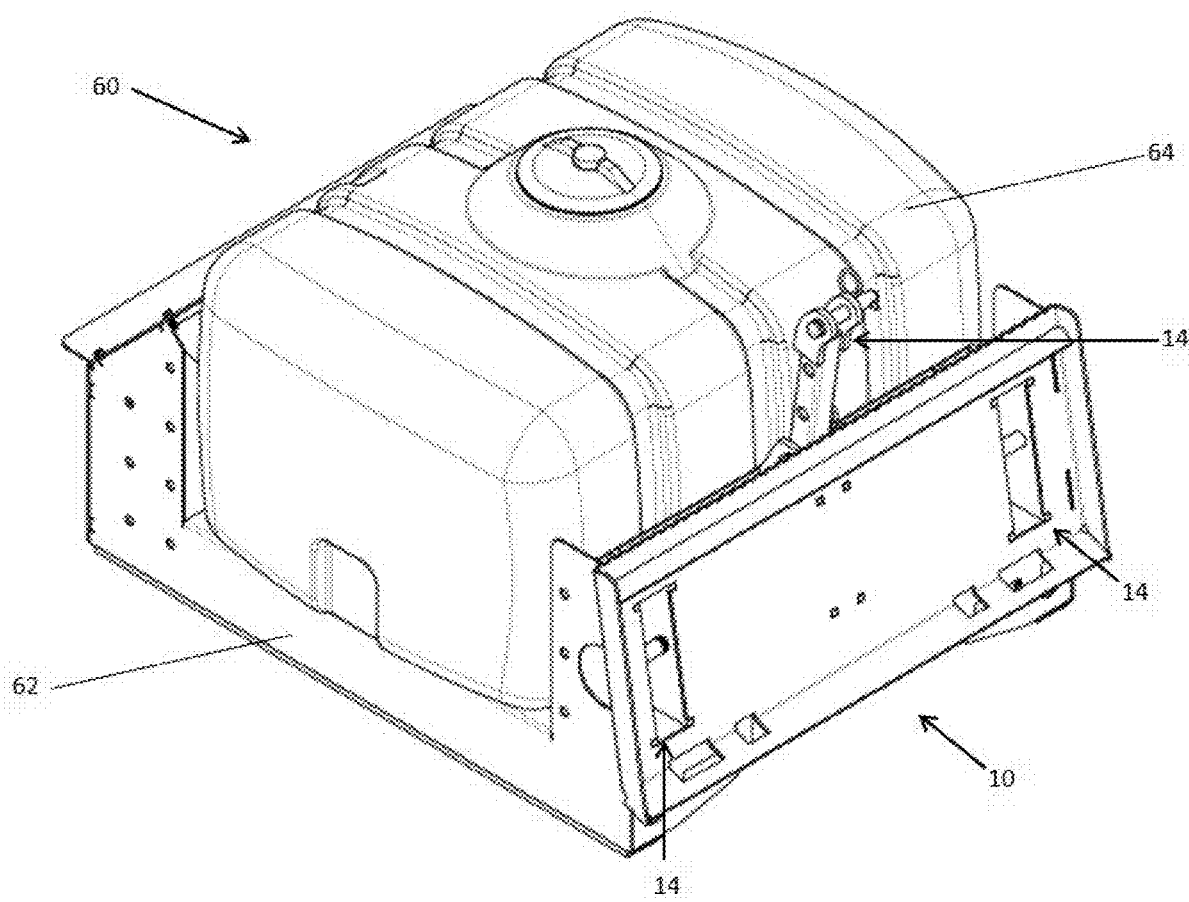
FIG. 3 is a perspective view of the attachment adapter depicted in FIG. 1 and FIG. 2 with an example attachment coupled thereto.

Referring now to FIG. 3, example implement 60 is depicted including adapter 10 coupled to platform 62 supporting liquid tank 64. Implement 60 in this depiction is an example only and should not be considered limiting. Implement 60 may include any known implement or any implement that is yet to be developed that can be utilized with a three point hitch and/or with a universal skid-steer quick attach.

Figure 4:
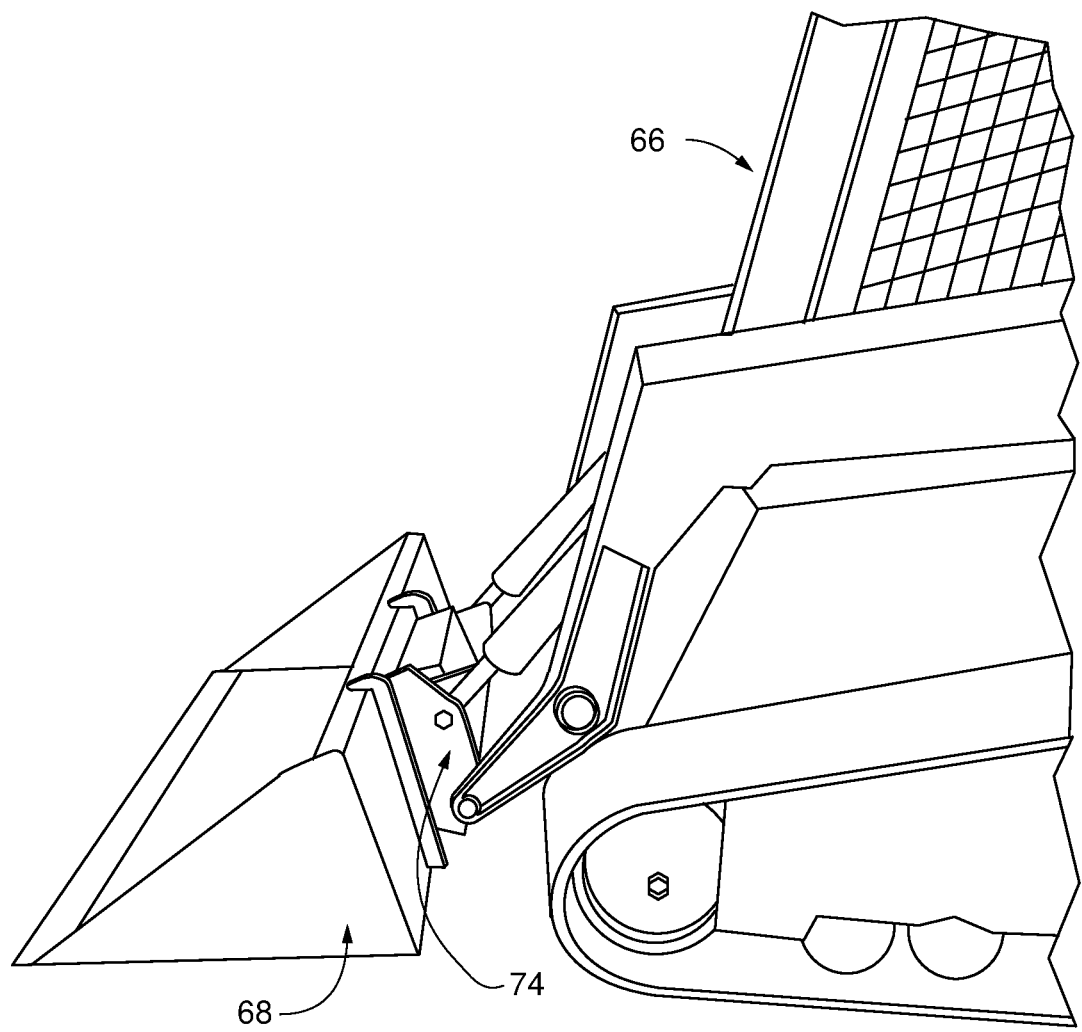
FIG. 4 is a perspective view of a skid steer loader with a bucket attachment attached thereto with a universal skid steer quick attach structure.

Referring now to FIG. 4, skid-steer loader 66 is depicted including coupled bucket attachment 68. Implement attachment portion 70 is part of the bucket attachment 68 while loader attachment portion 72 is a part of skid-steer loader 66. Implement attachment portion 70 together with loader attachment portion 72 form universal skid-steer attach 74. Implement attachment portion 70 in loader attachment portion 72 may be coupled and uncoupled by the engagement and disengagement of engagement locking pins (not shown.) When engagement locking pins (not shown) are disengaged, loader attachment portion 72 may be decoupled from implement attachment portion 70 by lowering and retracting loader attachment portion 72 so that it no longer engages under top bar 24.

Figure 6:
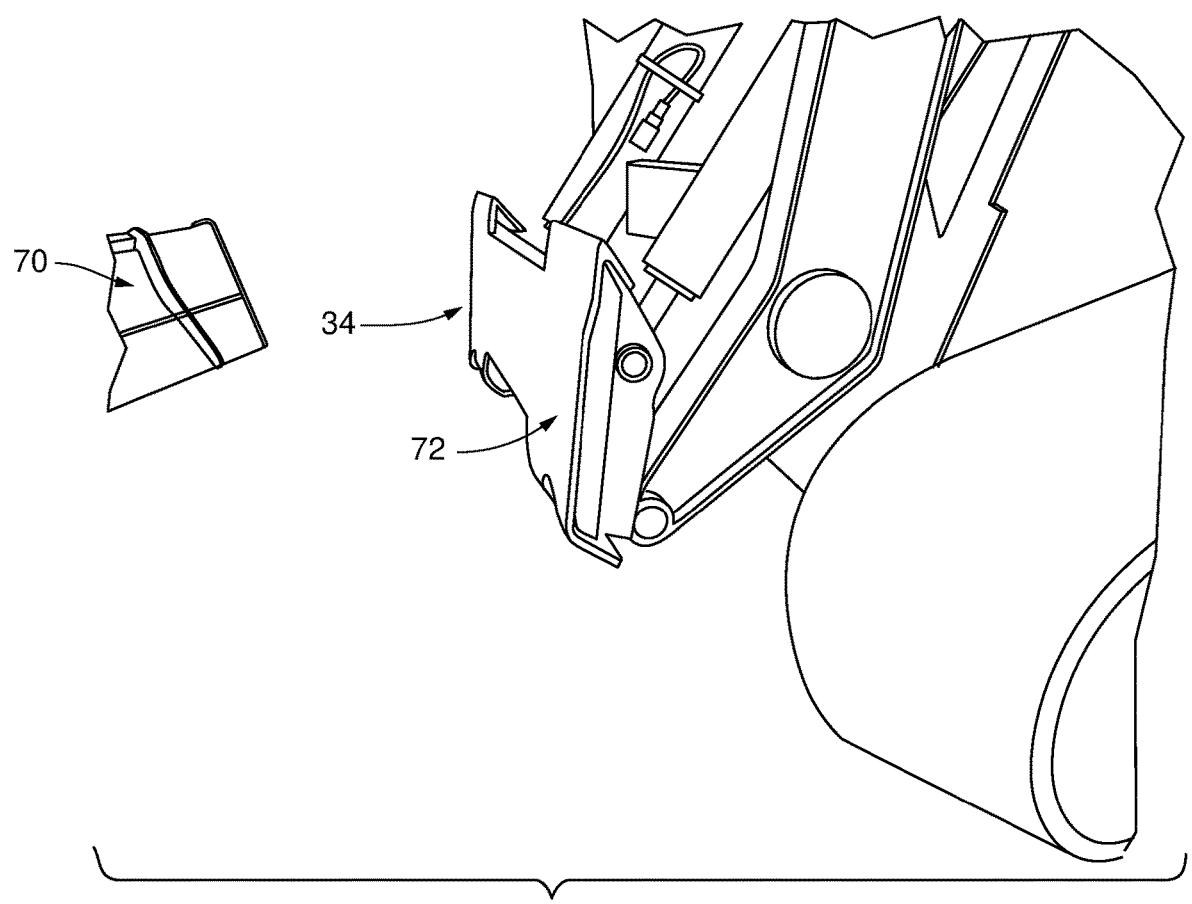
FIG. 6 is a perspective view of the skid steer loader depicted in FIG. 4 depicting a portion of a universal skid steer quick attach structure without an implement attached and a detached implement.

Referring now to FIG. 6, loader attachment portion 72 is depicted decoupled from implement attachment portion 70. Implement attachment portion 70 can readily be coupled to loader attachment portion 72 by engaging an upper edge of loader attachment portion 72 beneath top bar 24 of implement attachment portion 70, slightly lifting implement attachment portion 70 and engaging engagement locking pins (not shown.)

Figure 5:
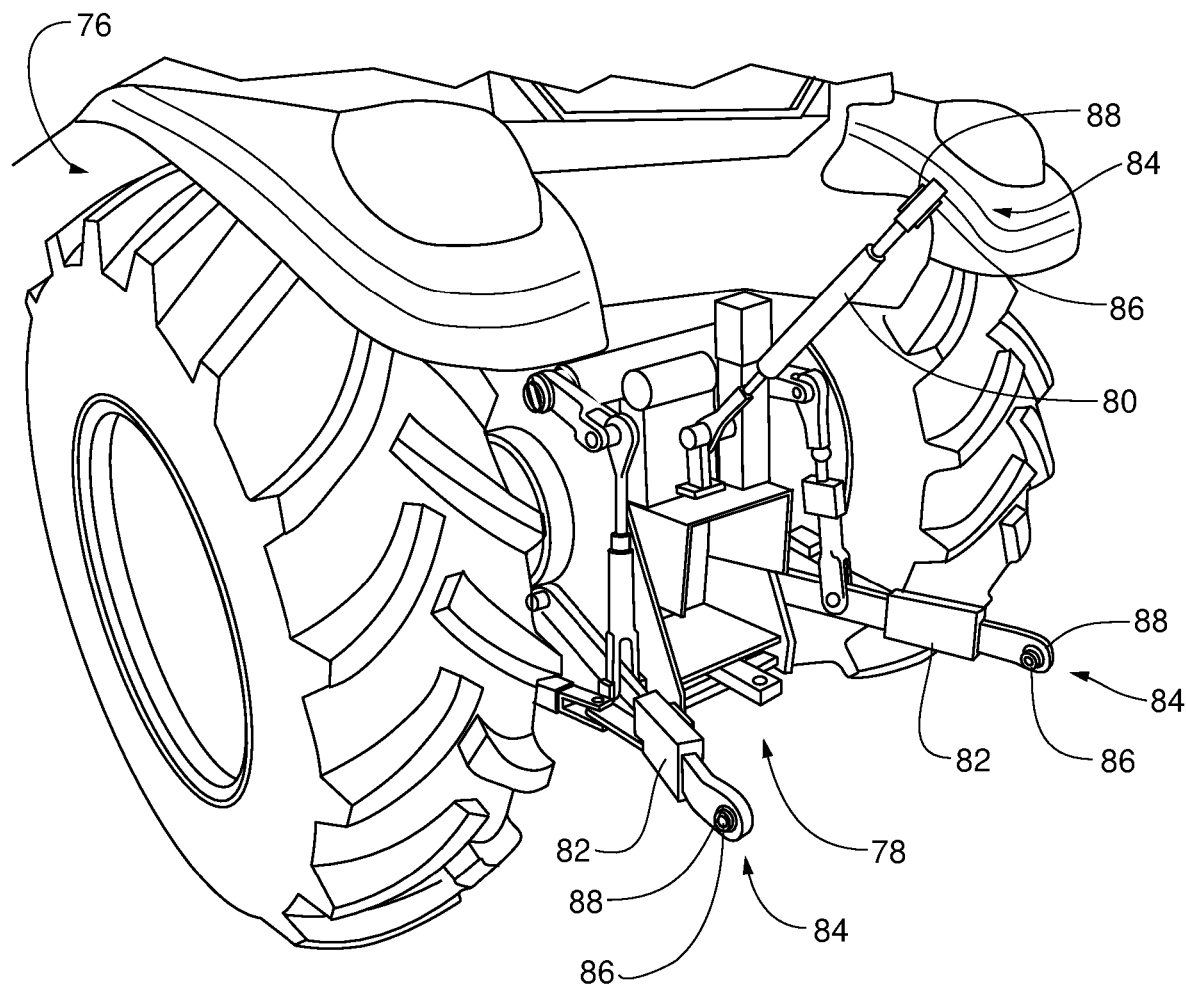
FIG. 5 is a perspective view of a tractor having a three point hitch attached.

Referring now to FIG. 5, tractor 76 including tractor three point hitch 78 is depicted. Tractor three point hitch 78 generally includes upper lifting arm 80 and two lower lifting arms 82. Each of upper lifting arm 80 and to lower lifting arms 82 includes at a distal end thereof ball joint 84 including aperture 86 passing through ball 88. Aperture 86 is adapted to receive a fastener (not shown) similar to lower clevis fastener 58 or fastener 50 when coupled to an implement (not shown.)

Embodiments of the invention also include a method of coupling an implement to two different tool carriers including a first tool carrier having a three point hitch and a second tool carrier having a universal skid steer quick attachment structure, the method includes: attaching an upper arm of the three point hitch to an upper clevis on an implement attachment adapter that is coupled to the implement;
attaching two lower arms of the three point hitch to two lower clevises on the implement attachment adapter;
on another occasion, engaging an upper edge of a loader attachment portion of a skid-steer loader beneath a top bar of the implement attachment adapter;
lifting the implement attachment adapter by raising the loader attachment portion; and
engaging locking pins of the loader attachment portion into coupling cutouts located in the implement attachment adapter.

Example embodiments of the method further include inserting ball joints proximate ends of the two lower arms of the three point hitch to a position recessed behind a plate of the implement attachment adapter.

Embodiments of the method further include disconnecting the upper arm of the three point hitch from the upper clevis; and disconnecting the two lower arms of the three point hitch from the two lower clevises on the implement attachment adapter.

Example embodiments of the method further include releasing the locking pins of the loader attachment portion from the coupling cutouts located in the implement attachment adapter; lowering the implement attachment adapter by lowering the loader attachment portion and disengaging the upper edge of the loader attachment portion from beneath the top bar of the implement attachment adapter.

In operation, adapter 10 is utilized at least as described in the method above. Adapter plate 12 is coupled cup uncoupled from mating quick attach structure 34 as described herein when it is desired to use for example, implement 60 with skid steer loader 66.

Three point adapter structure 14 is coupled to tractor 76 via three point hitch 78 when it is desired to use for example implement 60 with tractor 76.

Thus, a variety of implements 60 may be utilized with either tractors 76 or skid steer loaders 66 and potentially other tool carriers utilizing 3 point hitches 78 and universal skid steer quick attach structures 74 conveniently and without compromising effectiveness of example implements 60.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. An implement attachment adapter, comprising:
   a centrally located top clevis;
   two spaced apart lower clevises located below the centrally located top clevis and on opposing sides of a line extending vertically through the top clevis and the two spaced apart lower clevises being recessed into and behind a first face of a flat plate wherein the first face is a machine engaging face;
   the flat plate further including side tabs located proximate each horizontal peripheral edge thereof extending outwardly away from the first face of the plate;
   a bottom tab extending outwardly downwardly away from the first face at an obtuse angle relative to the plate;
   a top bar extending across proximate a top portion of the plate and outwardly away from the first face of the plate and oriented at an acute angle to the plate;
   the plate further presenting engagement apertures; and
   a second face opposing the first face wherein the second face is an implement engaging face to which the implement is integrally coupled.

2. The implement attachment adapter as claimed in claim 1, wherein the engagement apertures are formed as cutouts in the flat plate proximate the bottom tab, through the bottom tab or both proximate and through the bottom tab and sized and shaped to receive an engagement member therein.

3. The implement attachment adapter as claimed in claim 1, wherein the top clevis is coupled to an adjustment structure which is configured to be shifted between extended and retracted positions in which the top clevis is configured to be secured.

4. The implement attachment adapter as claimed in claim 1, wherein each lower clevis further comprises a proximal engagement structure and a distal engagement structure, each of the proximal engagement structure and the distal engagement structure having a hole therethrough through which a fastener is received.

5. The implement attachment adapter as claimed in claim 4, wherein each of the proximal engagement structure and the distal engagement structure comprises a planar plate secured to and extending away from the second opposing face of the flat plate.

6. The implement attachment adapter as claimed in claim 1, wherein the acute angle between the flat plate and the top bar is 32° plus or minus 5°.

7. The implement attachment adapter as claimed in claim 1, wherein the obtuse angle between the flat plate and the bottom tab is 125° plus or minus 10°.

8. The implement attachment adapter as claimed in claim 1, wherein the centrally located top clevis and the two spaced apart lower clevises are positioned and oriented to facilitate coupling of a tractor mounted three point hitch to the implement attachment adapter.

9. The implement attachment adapter as claimed in claim 1, wherein the flat plate, the side tabs, the bottom tab, the top bar and the engagement apertures are positioned and oriented to facilitate coupling of a loader attachment portion of a universal skid-steer quick attach structure to the implement attachment adapter.

10. A method of coupling an implement to two different tool carriers including a first tool carrier having a three point hitch and a second tool carrier having a universal skid steer quick attachment structure, the method comprising:
    providing an implement attachment adapter, comprising:
      a centrally located top clevis;
      two spaced apart lower clevises located below the centrally located top clevis and on opposing sides of a line extending vertically through the top clevis and the two spaced apart lower clevises being recessed into and behind a first face of a flat plate wherein the first face is a machine engaging face;
      the flat plate further including side tabs located proximate each horizontal peripheral edge thereof extending outwardly away from the first face of the plate;
      a bottom tab extending outwardly downwardly away from the first face at an obtuse angle relative to the plate;
      a top bar extending across proximate a top portion of the plate and outwardly away from the first face of the plate and oriented at an acute angle to the plate;
      the plate further presenting engagement apertures; and
      a second face opposing the first face wherein the second face is an implement engaging face to which the implement is integrally coupled;
    attaching an upper arm of the three point hitch to the upper clevis on the implement attachment adapter;
    attaching two lower arms of the three point hitch to the two lower clevises on the implement attachment adapter;
    on another occasion, engaging an upper edge of a loader attachment portion of a skid-steer loader beneath the top bar of the implement attachment adapter;
    lifting the implement attachment adapter by raising the loader attachment portion; and
    engaging locking pins of the loader attachment portion into coupling cutouts located in the implement attachment adapter.

11. The method as claimed in claim 10, further comprising inserting ball joints proximate ends of the two lower arms of the three point hitch to a position recessed behind the plate of the implement attachment adapter.

12. The method as claimed in claim 10, further comprising disconnecting the upper arm of the three point hitch from the upper clevis; and
    disconnecting the two lower arms of the three point hitch from the two lower clevises on the implement attachment adapter.

13. The method as claimed in claim 10, further comprising releasing the locking pins of the loader attachment portion from the coupling cutouts located in the implement attachment adapter; lowering the implement attachment adapter by lowering the loader attachment portion and disengaging the upper edge of the loader attachment portion from beneath the top bar of the implement attachment adapter.

14. An implement attachment adapter, comprising:
    an adapter plate configured to couple with a loader attachment portion of a universal skid steer quick attach including a first machine face and an opposing second implement face;

the second implement face being integrally coupled to the implement; and the first machine face including a three point adapter structure configured to couple with a three point hitch, the three point adapter structure having a centrally located top clevis; and two spaced apart lower clevises located below the centrally located top clevis and on opposing sides of a line extending vertically through the top clevis and the two spaced apart lower clevises being recessed into and behind the first machine face of the adapter plate;

wherein the implement attachment adapter is configured to be alternately engaged with the loader attachment portion of the universal skid steer quick attach or the three point hitch from the first machine face of the implement attachment adapter.

15. The implement attachment adapter as claimed in claim 14, wherein the adapter plate further comprises:

a plate portion including a first side tab, a second side tab, a bottom tab and a top bar.

16. The implement attachment adapter as claimed in claim 15, wherein the adapter plate further presenting coupling cutouts formed proximate or through the bottom tab.

17. The implement attachment adapter as claimed in claim 14, wherein the top clevis further comprises a supporting member which is configured to be extended, retracted and secured in at least one extended position and at least one retracted position.

18. The implement attachment adapter as claimed in claim 14, wherein the adapter plate further comprises:

a flat plate further including side tabs located proximate each horizontal peripheral edge thereof extending outwardly away from the first face of the plate;

a bottom tab extending outwardly downwardly away from the first face at an obtuse angle relative to the plate;

a top bar extending across proximate a top portion of the plate and outwardly away from the first face of the plate and oriented at an acute angle to the plate;

the plate further presenting engagement apertures.

\* \* \* \* \*